United States Patent
Kramer (10) Patent No.: US 11,734,493 B2
(45) Date of Patent: Aug. 22, 2023

(54) ENHANCED DATA ORCHESTRATION WITH PRE-TRAINED MACHINE LEARNING MODELS

(71) Applicant: TORCH RESEARCH LLC, Leawood, KS (US)

(72) Inventor: Jon Kramer, Leawood, KS (US)

(73) Assignee: TORCH RESEARCH LLC, Leawood, KS (US)

( * ) Notice: Subject to any disclaimer, the term of this patent is extended or adjusted under 35 U.S.C. 154(b) by 178 days.

(21) Appl. No.: 16/805,302

(22) Filed: Feb. 28, 2020

(65) Prior Publication Data

US 2021/0271802 A1    Sep. 2, 2021

(51) Int. Cl.
*G06F 40/117* (2020.01)
*G06F 16/957* (2019.01)
*G06N 20/00* (2019.01)
*G06F 40/106* (2020.01)

(52) U.S. Cl.
CPC ........ *G06F 40/117* (2020.01); *G06F 16/9577* (2019.01); *G06F 40/106* (2020.01); *G06N 20/00* (2019.01)

(58) Field of Classification Search
CPC .. G06F 40/117; G06F 16/9577; G06F 40/106; G06N 20/00
See application file for complete search history.

(56) References Cited

U.S. PATENT DOCUMENTS

| | | | |
|---|---|---|---|
| 8,078,677 B2 * | 12/2011 | Mendiola | H04L 67/535 715/764 |
| 9,317,566 B1 * | 4/2016 | L'Huillier | G06F 16/2455 |
| 11,487,932 B2 | 11/2022 | Kramer | |
| 2006/0173985 A1 * | 8/2006 | Moore | G06F 21/6254 709/223 |
| 2014/0289643 A1 * | 9/2014 | Shmunis | H04L 51/12 715/752 |
| 2014/0358982 A1 * | 12/2014 | Pareek | H04L 67/10 709/201 |
| 2015/0378984 A1 | 12/2015 | Ateya et al. | |

(Continued)

OTHER PUBLICATIONS

Kramer, Jon, "Automated Dynamic Data Extraction, Distillation, and Enhancement," filed Jul. 23, 2021, U.S. Appl. No. 17/384,413.
Kramer, Jon, "Graph Database Implemented Knowledge Mesh," filed Feb. 28, 2022, U.S. Appl. No. 17/706,341.

(Continued)

*Primary Examiner* — Hope C Sheffield (57) ABSTRACT

A method of enhanced data orchestration (EDO). The method comprises receiving a first message by a mediation application executing on a computer system and analyzing the first message by the mediation application based at least in part on invoking a machine learning (ML) model by the mediation application, wherein the analyzing determines that a feature of the first message is a probable first component of an item of personally identifiable information (PII). The method further comprises receiving a second message by the mediation application, determining by the mediation application that a feature of the second message when combined with the feature of the first message constitutes an item of PII, and treating the first message and the second message in accordance with predefined PII handling protocols by the mediation application.

19 Claims, 5 Drawing Sheets

(56) References Cited

U.S. PATENT DOCUMENTS

| | | | | |
|---|---|---|---|---|
| 2019/0325259 | A1* | 10/2019 | Murphy | G06K 9/6259 |
| 2019/0332658 | A1 | 10/2019 | Heckel et al. | |
| 2019/0384640 | A1 | 12/2019 | Swamy et al. | |
| 2020/0153928 | A1* | 5/2020 | Chauhan | H04L 63/0428 |
| 2020/0311616 | A1* | 10/2020 | Rajkumar | G06N 3/008 |
| 2021/0192387 | A1* | 6/2021 | Benson | G06F 17/18 |
| 2021/0273965 | A1 | 9/2021 | Pi et al. | |
| 2021/0279401 | A1 | 9/2021 | Kramer | |
| 2021/0279402 | A1 | 9/2021 | Kramer | |
| 2021/0279606 | A1 | 9/2021 | Srinivasan et al. | |

OTHER PUBLICATIONS

Kramer, Jon, "Combinatorial Inflight Analysis of Multipart Data," filed May 21, 2021, U.S. Appl. No. 17/326,812.

Kramer, Jon, "User Interface for Building an Enhanced Data Orchestration Enterprise Service Bus," filed May 21, 2021, U.S. Appl. No. 17/326,822.

Office Action dated Nov. 12, 2021, U.S. Appl. No. 17/326,812, filed May 21, 2021.

Office Action dated Nov. 23, 2021, U.S. Appl. No. 17/326,822, filed May 21, 2021.

Advisory Action dated Aug. 25, 2022, U.S. Appl. No. 17/326,812, filed May 21, 2021.

Notice of Allowance dated Oct. 25, 2022, U.S. Appl. No. 17/326,812, filed May 21, 2021.

Office Action dated Jul. 11, 2022, U.S. Appl. No. 17/706,341, filed Mar. 28, 2022.

Final Office Action dated Oct. 21, 2022, U.S. Appl. No. 17/706,341, filed Mar. 28, 2022.

Dessi, Danilo, et al., "Generating knowledge graphs by employing natural language processing and machine learning techniques within the scholarly domain," Future Generation Computer Systems 116 (2021): 253-264. (Year: 2020).

Final Office Action dated Jun. 2, 2022, U.S. Appl. No. 17/326,812, filed May 21, 2021.

Notice of Allowance dated Jun. 13, 2022, U.S. Appl. No. 17/326,822, filed May 21, 2021.

\* cited by examiner

ENHANCED DATA ORCHESTRATION WITH PRE-TRAINED MACHINE LEARNING MODELS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise service bus (ESB) provides a communication system between computer systems and/or software applications executing on computer systems. The ESB may abstract away details of interfacing with the different computer systems. For example, a source computer system may send a request to a destination computer system via the ESB without being concerned about what protocol the destination computer system prefers: the ESB can mediate between the request as made by the source computer system and the request as transmitted by the ESB to the destination computer system.

SUMMARY

In an embodiment, a system for enhanced data orchestration (EDO) using pre-trained machine learning models is disclosed. The system comprises at least one processor, a non-transitory memory, a plurality of pre-trained machine learning (ML) models stored in the non-transitory memory, a data format conversion application stored in the non-transitory memory, a mediation application stored in the non-transitory memory, and a message reassembly application stored in the non-transitory memory. When executed by the at least one processor, the data format conversion application receives a message in a first format and converts the content of the message to a second format, wherein the data format conversion application is configured to convert a plurality of different formats to the second format. When executed by the at least one processor, the mediation application receives the message in the second format from the data format conversion application, processes the message using at least some of the pre-trained ML models to obtain metadata associated with the message, and attaches the metadata to the message in the second format. When executed by the at least one processor, the message reassembly application reassembles the message with the attached metadata and transmits the reassembled message and metadata.

In another embodiment, a method of enhanced data orchestration (EDO) is disclosed. The method comprises receiving a first message by a mediation application executing on a computer system, parsing the first message by the mediation application into features based at least in part on invoking a machine learning (ML) model by the mediation application that executes on the computer system, and, based on the features, requesting information associated with the features by the mediation application. The method further comprises receiving information associated with the features by the mediation application, analyzing the information associated with the features by the mediation application based at least in part on invoking a ML model by the mediation application that executes on the computer system, assembling a second message by the mediation application based on the first message, attaching metadata provided by analyzing the information associated with the features by the mediation application to the second message, and transmitting the second message.

In yet another embodiment, a method of enhanced data orchestration (EDO) is disclosed. The method comprises receiving a first message by a mediation application executing on a computer system and analyzing the first message by the mediation application based at least in part on invoking a machine learning (ML) model by the mediation application, wherein the analyzing determines that a feature of the first message is a probable first component of an item of personally identifiable information (PII). The method further comprises receiving a second message by the mediation application, determining by the mediation application that a feature of the second message when combined with the feature of the first message constitutes an item of PII, and treating the first message and the second message in accordance with predefined PII handling protocols by the mediation application.

In another embodiment, a system for building an enhanced data orchestration (EDO) enterprise service bus is described. The system comprises at least one processor, a non-transitory memory, a plurality of pre-trained machine learning (ML) models stored in the non-transitory memory, a base enterprise service bus application stored in the non-transitory memory, and an EDO builder application stored in the non-transitory memory. When executed by the at least one processor, the EDO builder application presents a visual interface that responds to drag and drop command inputs that builds a sequence of data stream processes and presents a command input that when activated causes a properties dialog box to be presented that promotes a user defining data from the data stream to be passed in to the selected data stream process and defining data to be output by the selected data stream process. The EDO builder application further builds a EDO enterprise service bus application based on the pre-trained ML models, based on the base enterprise service bus application, based on drag and drop command inputs, and based on user definitions of data provided through the properties dialog box.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Enterprises and other large organizations may provide an enterprise service bus (ESB) structure within their computing environment to promote communication among disparate applications, services, and computer systems. Typically ESBs do not alter or supplement the content that they pipe among different enterprise entities but rather simply make conveyance of such content more seamless and transparent. In some circumstances, however, hazards are presented when content is simply transshipped from one system to another. For example, sometimes personally identifiable information (PII) is transferred from one system to another with the receiving system being unaware that the content comprises PII. This transfer then places PII protection obligations upon the receiving system which may be undesirable because the receiving system does not in fact have the needed PII protection mechanisms in place or does not want to accept the processing burden of properly managing PII. Additionally, an opportunity presents itself to enrich the content in transit across the ESB which conventional ESBs do not in fact take advantage of.

The present disclosure teaches an enhanced data orchestration (EDO) system that is an elaboration of and/or extension of a conventional ESB. The EDO product has several key innovative aspects which provide value for the end users as well as pathways for IP protection. The architecture at the heart of the system casts the key components into a uniform interactive environment providing ease of communication and natural interaction between the components as well as facilitating simple and straightforward stacking and substitution.

Key machine learning (ML) models and ML components are pre-configured to plug in to the interactive environment making for quick and reliable assembly to respond to different needs or newly observed opportunities. Additionally the environment is an excellent match for an EDO builder tool and associated user interface which allows more rapid and reliable spin up of new ML models and ML components allowing the user the flexibility to tweak their analysis on their own time and timetable to their own specifications. This can help a business in various ways, including supporting rapid prototyping, reducing the barriers to entry, and increasing speed to market with new products. Similarly the combination of the architecture, the pre-configured ML models, and the ability to create new ML models also provides the opportunity to pre-train the new ML models using the combination of existing pre-configured ML models as key feeding points in a stack jump starting training to further enhance new insights being pursued.

Other key aspects are able to leverage this foundational architectural approach to more flexibly and efficiently assemble and process messages than a traditional "Analytics" system, and features provided by the system taught herein take advantage of this approach in several ways. One technique taking advantage of the structures given is configuration to allow in-flight analysis of data and/or messages coming from multiple sources before it comes to rest rather than simply batch processing the large warehouses on fixed timetables. Particularly interesting solutions provide the ability to do a level of combinatorial analysis of multi-part data based on cached elements and indexes married with in-flight data for quicker potential reactions. This type of in-flight analysis facilitated by the architecture and its quick response shortens response time on potentially time sensitive issues and also potentially avoids reporting or violation issues where protected or potentially protected data combinations come to rest together in storage. In a specific use case, not only might simple PII or classified data be identified and rerouted to safe storage or appropriate agencies, but also more complex PII formed when two otherwise innocuous bits of information are combined through a common key might be identified and likewise diverted or avoided. Where the EDO system is being battle tested against some of the highest stakes clients and data—nimble efforts and rapid response define value adds critical for our current world but highly beneficial to many others.

The EDO receives messages passing between applications, services, and/or computer systems and processes them in-flight (meaning without storing them in long-term storage such as disk storage) to accomplish specialized data management which may generally be referred to as enhanced data orchestration. Enhanced data orchestration provides unified interaction of previously typically disparate and uncorrelated environment components. Different enterprises and/or organizations can configure the EDO to perform different kinds of data orchestration. As used herein, the term 'message' is used broadly to refer to content, requests, commands, responses, application programming interface (API) calls, protocol messages, and other communications that pass between applications, services, and/or computer systems. The EDO converts messages from their native format to a standard format (e.g., to extensible markup language (XML) format) for processing. The EDO then funnels the converted message through a data orchestration pipeline that parses and processes the converted message. After EDO processing is complete, the converted message is reassembled into a format that is suitable and sends the reassembled message to the receiving application, service, and/or computer system. The EDO can be thought of as a data orchestration pipeline built on top of a conventional ESB. Alternatively, the EDO can be thought of as a conventional ESB that has been evolved to an advanced configuration by the incorporation within it of a data orchestration pipeline. In an embodiment, the EDO comprises processes and software that ingest, normalize, and enrich data coming from disparate systems to deliver optimal information to downstream business and analytic systems.

The EDO may be defined by an enterprise and/or organization using an EDO builder tool. The EDO is built by taking a standard ESB and extending it with or attaching to it data orchestration functionality that can be referred to as the data orchestration pipeline. The data orchestration pipeline can be defined using a graphical user interface (GUI) to select, drag, and drop data orchestration utilities presented in the GUI onto a graphical depiction of the data orchestration pipeline. This promotes using pre-trained, pre-configured ML models in the unified execution environment (single run-time) of the EDO. Other data orchestration utilities may comprise, without limitation, an HTML scraper, a tagging mediator, a PDF mediator, a search mediator, an optical character recognition (OCR) utility, and other utilities. An HTML (hypertext markup language) scraper may take a uniform resource locator (URL) as an input, goes to the HTML page referenced by that URL, and scrapes or gathers the salient content of that web page. A tagging mediator may monitor data passing through the pipeline and write tags to the passing data and/or to a tag database according to pre-defined business rules. A PDF (portable document format) mediator may parse a searchable PDF file and return the textual content of the document for further processing. A search mediator may wrap the results of an external search (e.g., results of a Google search or results from another search engine) and transforms those results into an object suitable for further processing by the EDO. In an embodiment, the GUI can be used for customizing and creating new components or data orchestration utilities for adding into the data orchestration pipeline.

The EDO builder tool provides a properties definition dialog box that can be used to define parts and/or data types of converted messages to be processed by the subject data orchestration utility and to define the output of the data orchestration utility. Said in other words, the properties definition dialog box and/or other controls provided by the GUI provide an easy way to connect together the data orchestration utilities. In effect, the properties definition dialog box provides the glue to promote disparate and distinct data orchestration utilities collaborating with each other without having to explicitly integrate the utilities with each other. The properties definition dialog box allows the user of the EDO builder tool to treat the data orchestration utilities as component-ware. As an example, the properties definition dialog box associated with a tagging mediator may be used to define one or more match criteria, for example by specifying a regular expression for each match criteria. In an embodiment, each different data orchestration utility is associated with its own properties definition dialog box.

Some of the data orchestration utilities are machine learning (ML) models. The EDO builder tool provides a plurality of pre-trained ML models that can be selected, dragged, and dropped to graphically define, in part, a data orchestration pipeline. Additionally, some enterprises and/or organizations may compose and train proprietary ML models which can be identified to the EDO builder tool, in which case the proprietary ML models, likewise, can be selected, dragged, and dropped to graphically define the data orchestration pipeline. In an embodiment, a Deeplearning4j (DL4J) utility may be used to build, train, optimize, and export a proprietary ML model to make it easily accessible to the EDO builder tool. In an embodiment, the pre-trained ML models may comprise a PII identification ML model, a name entity extraction ML model, a date entity extraction ML model, a place entity extraction ML model, a currency entity extraction ML model, a company entity extraction ML model, a language translation ML model, a sentiment analysis ML model, a behavioral anomaly ML model, and a component failure ML model. It is understood that other pre-trained ML models may be incorporated into the EDO builder tool easily.

Additionally, in an embodiment, the GUI provides controls and utilities for training proprietary ML models. In an embodiment, one or more of the pre-trained ML models may be used to train a proprietary ML model using controls and utilities provided by the GUI. Alternatively, in an embodiment, a ML definition and training application that is separate from the EDO builder tool may provide controls and utilities for training proprietary ML models and/or training a proprietary ML model using a pre-trained ML model.

The PII identification ML model takes inputs and produces an output that identifies PII that may be present in a message. The PII may be a social security number or a credit card number or other information. The inputs may comprise outputs from other ML models such as names and currency embedded in the message. The inputs may provide the names or currency in the form of features. As described further below, the PII identification ML model may identify a feature in a message that is deemed likely to constitute PII when combined with a corresponding feature in another message. The PII identification ML model can promote attaching tags or metadata to messages to promote a receiver being forewarned that the message contains PII and so the receiver can handle the message accordingly.

The entity extraction ML models can identify specific entities embedded in a message and can create metadata that can be attached to the message or that can be used by other data orchestration utilities or ML models downstream in the data orchestration pipeline. The name entity extraction ML model identifies features that are deemed likely to be names embedded in the message. The date entity extraction ML model identifies features that are deemed likely to be dates embedded in the message. The place entity extraction ML model identifies features that are deemed likely to be places (e.g., names of places, addresses, geographical features) embedded in the message. The currency entity extraction ML model identifies features that are deemed likely to be currency figures in the message. The company entity extraction ML model identifies features that are deemed likely to be company names or company logos in the message.

The language translation ML model translates words or phrases into another language. The language translation ML model may translate between a stipulated first language to a stipulated second language, where the first language and the second language are selected from a number of predefined languages. A sentiment analysis ML model estimates a sentiment that is deemed to be associated with the message. In an embodiment, the sentiment is characterized with a number to represent a degree of the sentiment.

A behavioral anomaly ML model determines whether an individual associated with the message is deemed to exhibit anomalous behavior, for example a behavior which is relatively uncharacteristic for the individual. The behavioral anomaly ML model may take action to access additional information about the individual, for example searching through one or more social networking web sites, searching through public tweets of the individual, searching real simple syndication (RSS) feeds for information.

A component failure ML model determines relationships between components of an assembly to determine risk of failure and project a part failure. In an embodiment, the component failure ML model determines relationships between business entities in a supply chain to determine risk of perturbation of the supply chain by one or more of the business entities.

Some of the pre-trained ML models may comprise a neural network. Without wishing to be bound by theory, a neural network may be conceived of as describing a complex behavior or event pattern as a singular non-linear equation. Alternatively, the neural network can be supposed to encapsulate a ML model that maps inputs to the output—for example a prediction of future human behavior or a probability of a specific event pattern occurring. What is distinctive about neural networks is that the developer or data scientist does not define this mapping of the ML model but uses a machine learning training application to autonomously generate and refine the ML model by providing large sets of inputs and outputs. By successively running input sets through the algebraic ML model to produce an output, comparing the output to the canonical output, and adapting the ML model, the ML model becomes better and better tuned to producing the canonical outputs. An example would be providing millions of images of different cats to the machine learning training application to train the neural network to identify an image as containing or not containing the picture of a cat. One or more of the ML models may comprise a recurrent neural network (RNN). One or more of the ML models may comprise a convolutional neural network (CNN).

It will be appreciated that designing neural networks, training neural networks, and deploying neural networks in applications can be complex and intellectually demanding. Providing a framework for incorporating pre-trained ML models into an EDO can relieve enterprises of the burden of performing complicated data science and neural network modeling on their own while at the same time allowing those enterprises the opportunity to gain the great benefits of using the pre-trained ML models in their EDO system. Additionally, the use of pre-trained ML models can speed the process of developing and deploying an EDO ESB. In some contexts the pre-trained ML models may be referred to as "out-of-box machine learning models," emphasizing the ease of deployment and application of the pre-trained ML models. It is noted that part of the ease of deployment of the ML models—either the pre-trained ML models or the proprietary models—is the support provided by the EDO builder tool for composing the ML models into a data orchestration pipeline using a GUI, promoting ease of definitions of inputs and outputs of the ML models to the data orchestrate pipeline and flowing the outputs of one ML model by the data orchestration pipeline into the subsequent ML model.

The EDO builder tool may further promote the ease of defining significant context information for one or more of the ML models. Context information may be defined in ontology files and presented by the GUI. By selecting ontology files and associating them with one or more ML models, the ML models may make use of the rich context information definitions stored in the ontology files. As an example, a unique name may have a first meaning in a first context but have a second meaning in a second context. For example, the phrase "London Bridge is falling down" may have a first meaning in the context of a message relating to a publication of a children's song book but have a second meaning in the context of a message relating to a news feed from the British Broadcasting Service (BBC). The ontology files can define such context definitions for a variety of different categories of unique names. Without wishing to be bound by theory, an ontology file may be considered to provide supplements to the training of the ML models that are associated to the ontology file.

A mediation application of the EDO system may execute the enhanced data pipeline to process the converted messages. The output of each utility in the enhanced data pipeline may be flowed as input into the subsequent utility in the enhanced data pipeline. In an embodiment, the mediation application may identify PII associated with a converted message (e.g., by executing a data pipeline that comprises a pre-trained PII ML model) and add one or more tags or metadata artifacts to the reassembled message that points out the PII to the receiving application, service, and/or computer system. This may enable the receiver to handle the PII properly—for example storing the PII securely and/or enforcing a predefined time to live of the PII data or by processing the PII without storing it in disk storage.

In an embodiment, the mediation application may identify names associated with a converted message (e.g., by executing a data pipeline that comprises a pre-trained name entity extraction ML model) and add one or more tags or metadata artifacts to the reassembled message that points out the identified names to the receiver. Alternatively, the tags or metadata may be attached to the converted message for processing by a subsequent utility in the data enhancement pipeline. In an embodiment, the mediation application may identify dates, places, currencies, and companies associated with the converted message (e.g., by executing a pre-trained date entity extraction ML model, a pre-trained place entity extraction ML model, a pre-trained currency entity extraction ML model, and/or a pre-trained company entity extraction ML model) and add one or more tags or metadata artifacts to the reassembled message. Alternatively, the tags or metadata artifacts may be attached to the converted message for processing by a subsequent utility in the data enhancement pipeline.

In an embodiment, the mediation application may translate portions of a converted message (e.g., by executing a pre-trained language translation ML model) and attach one or more tags or metadata artifacts to the converted message, for example for processing by a subsequent utility in the data enhancement pipeline. Alternatively, the tags or metadata may be attached to the reassembled message. In an embodiment, the mediation application may analyze sentiment associated with a converted message (e.g., by executing a pre-trained sentiment analysis ML model) and add one or more tags or metadata artifacts to the reassembled message. Alternatively, the tags or metadata may be attached to the converted message for processing by a subsequent utility in the data enhancement pipeline. In an embodiment, the mediation application may evaluate a component failure and/or component failure risk (e.g., by executing a pre-trained component failure ML model) and attach one or more tags or metadata artifacts to the converted message, for example for processing by a subsequent utility in the data enhancement pipeline. Alternatively, the tags or metadata may be attached to the reassembled message.

In an embodiment, the mediation application is able to reach out to a variety of information sources in real-time to provide additional input to one or more of the ML models. For example, the mediation application may use a name identified by a pre-trained name entity extraction ML model to search a social network site for posts submitted by the named person, to search a twitter feed for tweets posted by the named person, to obtain demographic information on the named person. This information may in turn be input, along with the converted message and/or feature data, to another pre-trained ML model or proprietary ML model for analysis.

In an embodiment, the processing of human behavioral data by the mediation application may identify when a person exhibits a significant change of behavior. For example, the mediation application executing a pre-trained behavioral anomaly ML model may determine that a significant behavioral change has been exhibited by a person, and that person may be subjected to additional security scrutiny. This kind of analysis may be useful for banking enterprises, stock trading enterprises, defense contractor enterprises, law enforcement organizations, and other like sensitive organizations.

In an embodiment, the processing of PII by the mediation application may identify information as being a candidate for being a constituent of PII. For example, a first article of information may not itself be PII, a second article of information may not itself be PII, but when the first article of information and the second article of information are associated together then they constitute PII. For example, the name Adam Smith, a first article of information, is not by itself PII; the name Hotel Division of Labor in Miami combined with a date range corresponding to a period of residence at the hotel, a second article of information, is not by itself PII; but the association of Adam Smith with a specific period of residence at the Hotel Division of Labor in Miami DOES constitute PII.

By identifying information as being a candidate for being a constituent of PII, when a second article of information is extracted (e.g., by a pre-trained entity extraction ML model), the mediation application can identify composed PII while at least a portion of the PII is still in flight and not yet stored on a storage disk (typically PII regulations pertain to "permanent storage" of PII in memory, which is deemed to refer to storage on a storage disk such as a disk drive memory storage component). The mediation application can then take appropriate action, for example attaching a tag and/or metadata to the reassembled message carrying the article of information that, when associated with a previously transmitted article of information, constitutes PII. It is noted that PII is generally not handled very well by existing computer systems. But yet pressure is increasing to provide responsible treatment of PII, for example as illustrated by the general data protection regulation (GDPR) in the European Union. The handling of composed PII by the EDO as described above provides a new and useful tool for protecting PII.

In an embodiment, the PII identification ML model can identify a first item of information in a first message as likely to be PII when combined with a second item of information (which has not yet been presented by any message). In this case, the EDO may cache the first message for a predefined period of time, in expectation that a second message containing the second item of information which, when associated with the first item of information, constitutes PII. The EDO may cache the first message 10 seconds, 15 second, 30 seconds, 1 minute, or some other relatively short period of time. If a second message is processed by the PII identification ML model while the first message remains cached, the PII identification ML model may tag the first message identifying the first item and further identifying the second message, then send the first message on to the receiver. The PII identification ML model may tag the second message identifying the second item and further identifying the first message, then send the second message on to the receiver. The receiver may act upon the tags of the first and second message and handle the combined PII appropriately—avoid storing in long term storage or store and provide appropriate securing of the PII. This may be referred to as combinatorial, in-flight analysis and processing of messages.

In an embodiment, the mediation application can be defined to redirect messages destined to a first receiver instead to a second receiver, for example to send a message that the mediation has deemed as comprising PII to a receiver application, service, and/or computer system that is configured to handle the PII. In an embodiment, the mediation application may redirect messages destined to a first receiver instead to a second receiver that the mediation application has deemed a higher authority of security, for example to process a message that is germane to enterprise cyber security or is germane to physical security.

Because the EDO executes in a unified runtime environment, data may easily and quickly be shared and/or passed between data orchestration utilities and/or ML models. This enables the EDO to process and/or enrich a message passing from a source node to a destination node in an enterprise computer network in real-time.

The EDO builder tool may be provided by an enterprise as a product to customer enterprises and/or organizations. The EDO builder tool provider may maintain a data store made accessible to its authorized customers where the EDO builder tool may access the pre-trained ML models from a central location. In this way, customers of the EDO builder tool provider may be able to access new versions of pre-trained ML models as they become available. Also, the existing pre-trained ML models may be improved through on-going training, and customers may periodically rebuild their EDOs using the EDO builder tool incorporating the new and/or updated pre-trained ML models.

The EDO system and the EDO builder tool described herein provide a particular computer solution to a technical problem or, indeed, to a plurality of technical problems. The EDO system can enrich messages in-flight from a source node to a destination node in a computer network without noticeably delaying the delivery of the messages. The EDO system can improve the responsible handling of PII to protect privacy of human individuals. The EDO system can allow enterprises to benefit from the advancement of data science through the incorporation of pre-trained ML models without having to employ a dedicated data science staff to do so.

Figure 1:
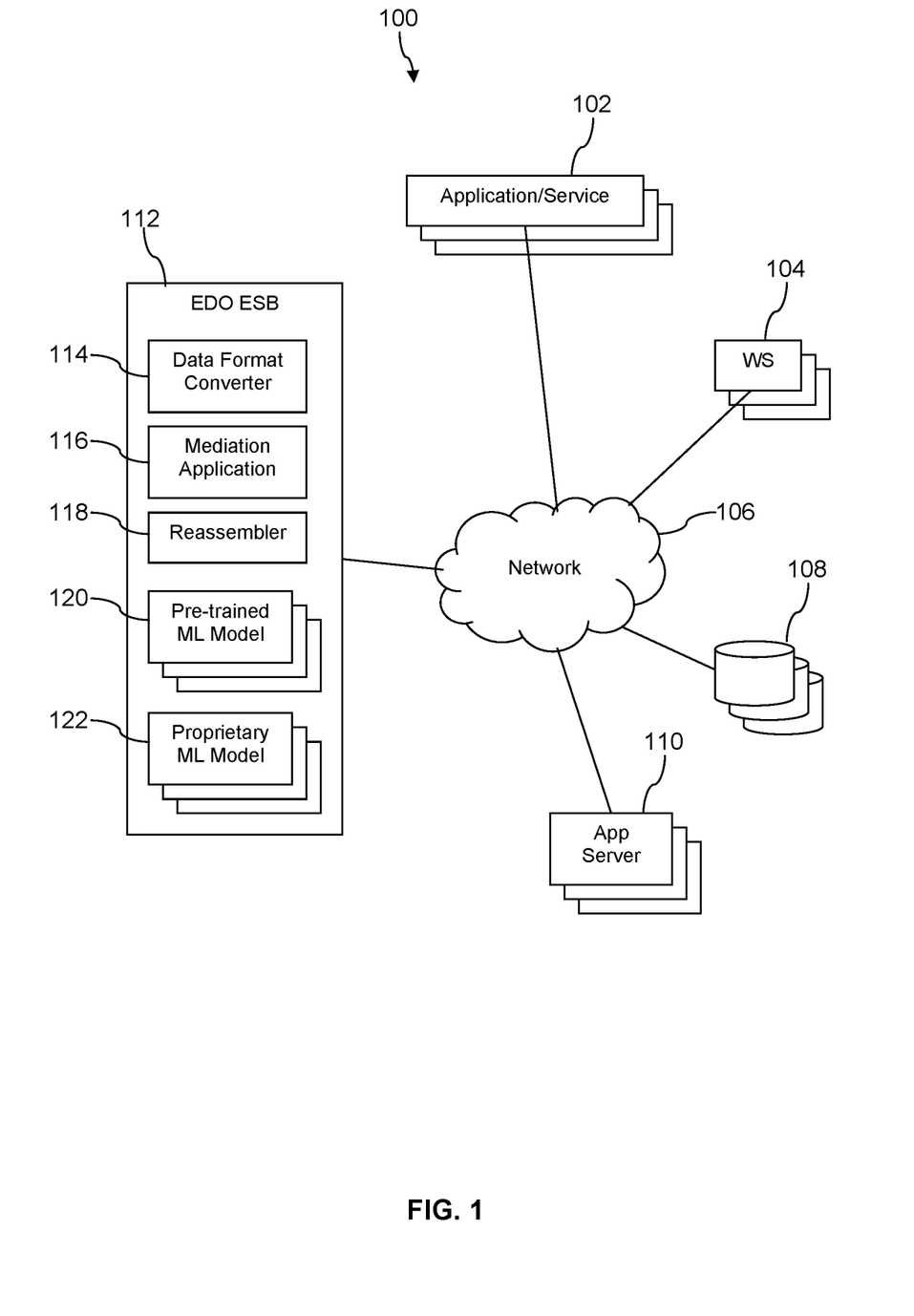
FIG. 1 is a block diagram of a system according to an embodiment of the disclosure.

Turning now to FIG. 1, a computing system 100 is described. In an embodiment, the system 100 comprises one or more applications and/or services 102, one or more workstations 104, a network 106, one or more data stores 108, and one or more application servers 110. In some circumstances, the system 100 is an enterprise computing system or an organization-wide computing system. The system 100 promotes users or employees of an enterprise or an organization to collaborate and communicate with each other via the workstations 104. This collaboration and communication is promoted by an enhanced data orchestration (EDO) enterprise service bus (ESB) which mediates message communication among applications and/or services 102, the workstations 104, the data stores 108, and the application servers 110.

The network 106 comprises one or more public networks, one or more private networks, or a combination thereof. In an embodiment, part of the network 106 provides a virtual private network (VPN) functionality. The applications and/or services 102 may comprise proprietary applications or services and/or commercial off-the-shelf applications or services. Each application or service 102 may execute on a computer system. The applications or services 102 may comprise a human resources application or service. The applications or services 102 may comprise an accounting application or service. The applications or services 102 may comprise an inventory control application or service. The applications or services 102 may comprise a financial credit assessment application or service. The applications or services 102 may comprise a trustworthiness assessment application or service. The applications or services 102 may comprise an enterprise cyber security monitoring and/or cyber threat counter measures management application or service. The data stores 108 may store proprietary information and/or publicly available information. The application servers 110 may provide access to applications through a web interface to the workstations 104. The applications supported by the application servers 110 may be proprietary or off-the-shelf applications.

The EDO ESB 112 may comprise a data format converter 114, a mediation application 116, a message reassembler 118, one or more pre-trained machine learning (ML) models 120, and optionally one or more proprietary ML models 122. In some contexts, the data format converter 114 may be referred to as a data format conversion application. In some contexts, the message reassembler 118 may be referred to as a message reassembly application. In some contexts, the optional one or more proprietary ML models 122 may be referred to as custom ML models.

The EDO ESB 112 may be considered to be a software application or a collection of software applications that execute on a computer system. The data format converter 114, the mediation application 116, the message reassembler 118, the one or more pre-trained ML models 120, and the optional one or more proprietary ML models 122 may be stored in a non-transitory memory of the computer system or in a memory storage peripheral (e.g., a magnetic disk drive or an optical disk drive). Computer systems are described further hereinafter. The mediation application 116 provides some of the functionality of a conventional ESB but additionally provides novel functionality that collectively can be termed enhanced data orchestration. The EDO ESB 112 may be built using an EDO ESB builder application which is described hereinafter with reference to FIG. 2.

When an application or service 102 transmits a message to a workstation 104 (for example in response to a request or an application programming interface (API) call transmitted previously by the workstation 104 to the subject application or service 102), the message is first routed through the EDO ESB 112. The EDO ESB 112 processes the message, and then the EDO ESB 112 may retransmit the subject message, possibly augmented with tags, metadata, or other information attached to the message.

In an embodiment, the EDO ESB 112 processes the message without storing it in permanent storage, for example without storing it in a disk storage memory such as a magnetic disk memory storage or an optical disk memory storage. This may be referred to in some contexts as the EDO ESB 112 processing the message in-flight, distinguishing it from an alternative kind of processing that might store the message in permanent storage before processing. This distinction can be important when processing data that contains personally identifiable information (PII), because increasingly demanding regulations apply to how PII is controlled and managed. PII regulations are typically not applicable if the PII is not permanently stored. Additionally, by processing the message in-flight the burden on a computer system is decreased and the computer time consumed by processing of the message may be reduced (input/output operations for permanent memory such as magnetic disk and optical disk are well known to be much slower than corresponding input/output operations for electronic memory such as main memory or random access memory).

The EDO ESB 112 first processes the message in the data format converter 114 to convert the message to a standard format that is amenable to processing by the rest of the EDO ESB 112—for example by the mediation application 116, the pre-trained ML models 120, and the optional proprietary ML models 122. In an embodiment, the standard format may be extensible markup language (XML) format. In an embodiment, the standard format may be a JavaScript Object Notation (JSON) format. In an embodiment, the standard format may be a comma separated value (CSV) format, a data format description language (DFDL) format, or a plain old java object (POJO) format. In an embodiment, the standard format may be another general description format.

The converted message is then processed by the mediation application 116 in accordance with a data orchestration pipeline that has been built and/or configured for the particular EDO ESB 112. In an embodiment, the mediation application 116 may parse the converted message and extract features from the parsed converted message. The mediation application 116 may then pass the extracted features and/or portions of the parsed converted message to one or more ML models 120, 122 that have been built into the data orchestration pipeline. Alternatively, the mediation application 116 may parse the converted message and the ML models 120, 122 in the data orchestration pipeline may perform feature extraction on at least portions of the parsed converted message.

The pre-trained ML models 120 built into the data orchestration pipeline (e.g., using the EDO builder tool discussed further below with reference to FIG. 2) may be one or more of a PII identification ML model, one or more entity extraction ML models, a language translation ML model, a sentiment analysis ML model, a behavioral anomaly ML model, and a component failure ML model. The entity extraction ML models may comprise a name entity extraction ML model, a date entity extraction ML model, a place entity extraction ML model, a currency entity extraction ML model, a company entity extraction ML model, and/or other entity extraction ML models.

Figure 2:
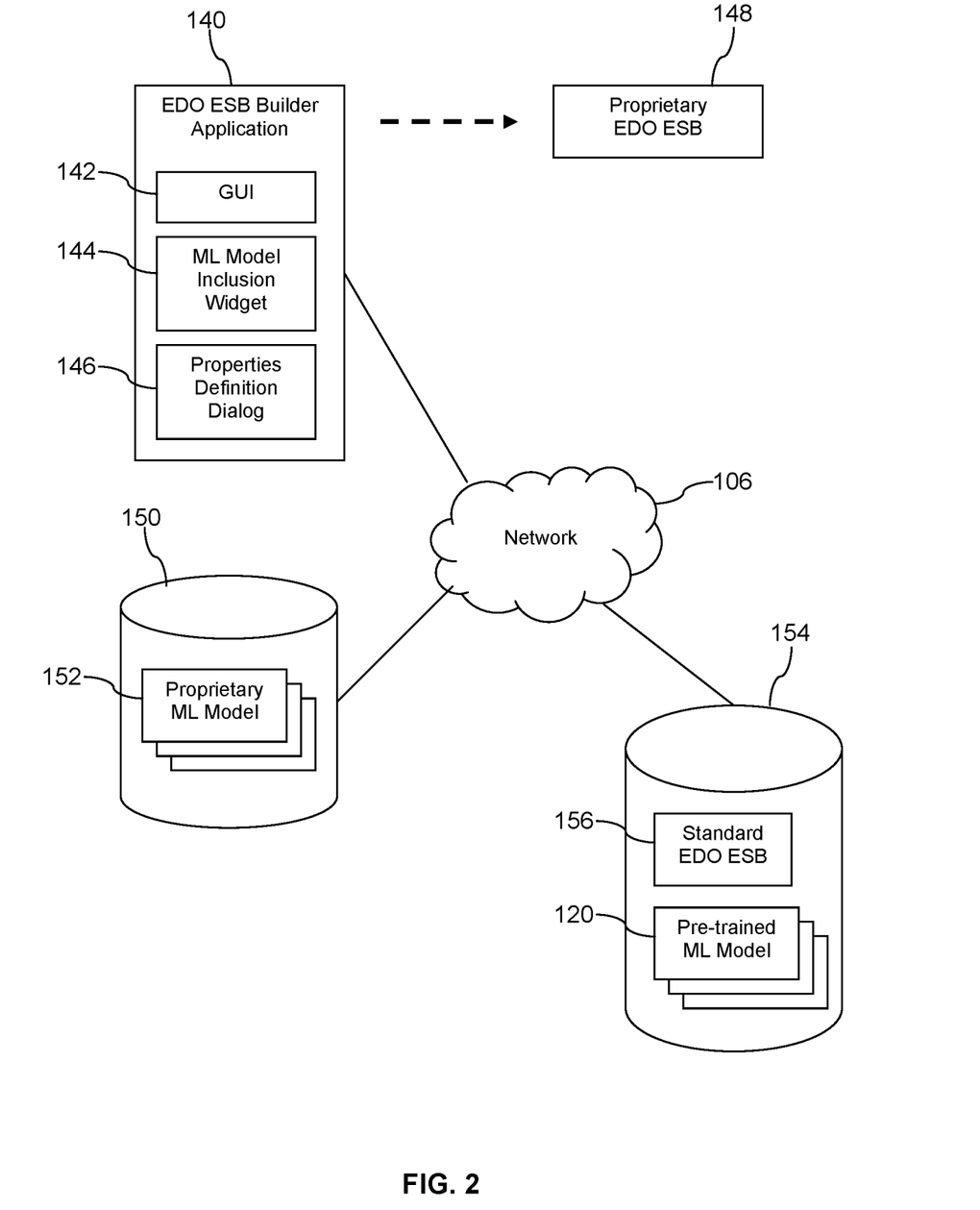
FIG. 2 is a block diagram of an enhanced data orchestration (EDO) enterprise service bus (ESB) builder system according to an embodiment of the disclosure.

Turning now to FIG. 2, an EDO ESB builder application 140 is described. In an embodiment, the EDO ESB builder application 140 comprises a graphical user interface (GUI) 142, a machine learning (ML) model inclusion widget 144, and properties definition dialog 146. The EDO ESB builder application 140 may communicate with a data store 150 that stores one or more proprietary ML models 152. The EDO ESB builder application 140 may also communicate with a data store 154 that stores a standard EDO ESB 156 and a plurality of pre-trained ML models 120. When the EDO ESB builder application 140 is executed on a computer (e.g., executed on a workstation 104), the GUI 142 presents graphical controls and prompts to compose a data orchestration pipeline from components that are represented as icons or entries in drop-down lists in a display presented by the GUI 142. In some contexts, the presented display may also be referred to as a GUI. The components may be referred to as data orchestration utilities and may include pre-trained ML models 120 or proprietary ML models 152. Other data orchestration utilities may comprise, without limitation, an HTML scraper, a tagging mediator, a PDF mediator, a search mediator, an optical character recognition (OCR) utility, and other utilities. An HTML (hypertext markup language) scraper may take a uniform resource locator (URL) as an input, goes to the HTML page referenced by that URL, and scrapes or gathers the salient content of that web page. A tagging mediator may monitor data passing through the pipeline and write tags to the passing data and/or to a tag database according to pre-defined business rules. A PDF (portable document format) mediator may parse a searchable PDF file and return the textual content of the document for further processing. A search mediator may wrap the results of an external search (e.g., results of a Google search or results from another search engine) and transforms those results into an object suitable for further processing by the EDO.

The ML model inclusion widget 144 may be used to make the proprietary ML models 152 known to the EDO ESP builder application 140. This may be referred to in some contexts as importing the proprietary ML model 152 into the EDO ESB builder application 140. The GUI 142 accesses a data store 154 via the network 106 to obtain a copy of the standard EDO ESB 156 and to obtain copies of the pre-trained ML models 120. The data store 154 may be a centrally located data store maintained by an enterprise that created the EDO ESB builder application 140 and sells it as an off-the-shelf software application. The provider enterprise may upgrade and enhance the standard EDO ESB 156 and/or the pre-trained ML models 120 and make them available to authorized clients to build and/or rebuild their EDO ESB using the EDO ESB builder application 140.

The GUI 142 may present icons for each of the pre-trained ML models 120 and icons for any optional proprietary ML models 152. A user may select and click on an icon of one of the pre-trained ML models 120 and drag and drop the icon onto the graphical depiction of the data orchestration pipeline. The data orchestration pipeline may be considered to operate on top of the standard EDO ESB 156 (e.g., at an application layer that rides on top of and utilizes services provided by a communication infrastructure layer provided by the standard EDO ESB) or to extend and elaborate the standard EDO ESB 156. By dropping the icon to the left or right of a previously positioned icon in the graphical depiction of the pipeline, the sequence of execution of the data orchestration utility associated with the icon (e.g., utility, pre-trained ML model, or proprietary ML model or other utility) executes sequentially before or after the previously positioned icon when the EDO ESB built using the EDO ESB builder application 140 is executed on in a live production computer environment.

The GUI 142 provides controls for selecting the properties definition dialog 146. The properties definition dialog 146 may be used to define features and/or data formats of inputs to the data orchestration utilities, for example inputs to the pre-trained ML models 120 and/or proprietary ML models 152. The properties definition dialog 146 may be used to define the output and data formats of the outputs from data orchestration utilities. In this way, the properties definition dialog 146 can define the flow of information and data through the data orchestration pipeline.

When the data orchestration pipeline has been defined by the user, a function of the EDO ESB builder application 140 can be invoked to build an executable file that may be referred to as a proprietary EDO ESB 148. This proprietary EDO ESB 148 can be installed in a computer system by the authorized client and then executed to provide the function of the EDO ESB 112 described above with reference to FIG. 1. By following this process a second time, the authorized client can use the EDO ESB builder application 140 to build a new proprietary EDO ESB 148 that uses updated and/or newly released pre-trained ML models 120, proprietary ML models 152, or an updated standard EDO ESB 156. It is understood that the proprietary EDO ESB 148 may be a collection of executable files as well as data or configuration files. In an embodiment, the proprietary EDO ESB 148 is generated in the form or a Java archive file (JAR file).

Figure 3:
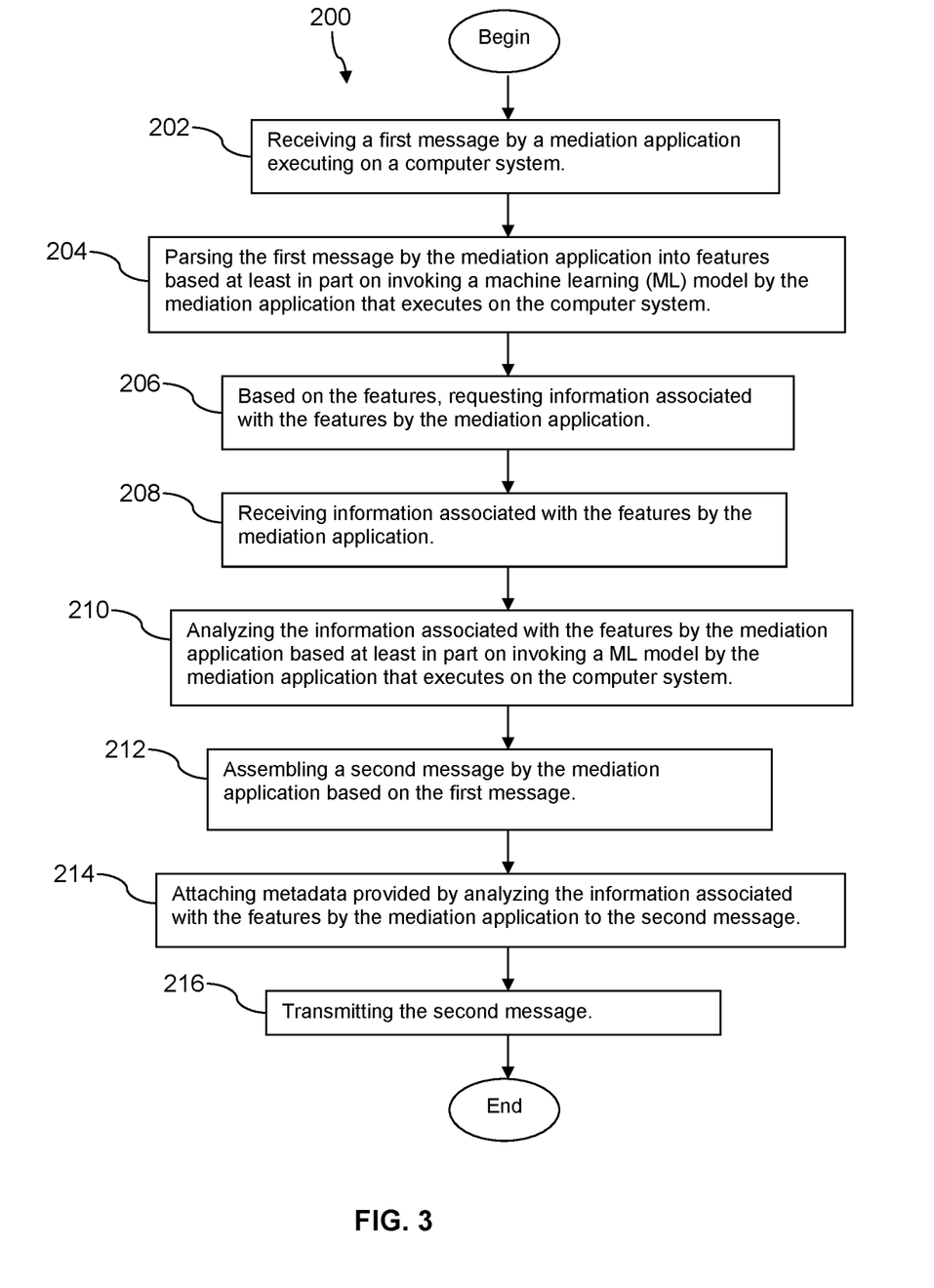
FIG. 3 is a flow chart of a method according to an embodiment of the disclosure.

Turning now to FIG. 3, a method 200 is described. In an embodiment, the method 200 is a method of enhanced data orchestration (EDO). At block 202, the method 200 comprises receiving a first message by a mediation application executing on a computer system. In an embodiment, the processing of the first message on the computer system does not involve the mediation application storing the first message in permanent storage. At block 204, the method 200 comprises parsing the first message by the mediation application into features based at least in part on invoking a machine learning (ML) model by the mediation application that executes on the computer system.

At block 206, the method 200 comprises based on the features, requesting information associated with the features by the mediation application. Requesting information associated with the features may comprise accessing a social networking web site. Requesting information associated with the features may comprise accessing a demographic information application server to obtain demographic information. Requesting information associated with the features may comprise accessing a really simple syndication (RSS) feed. At block 208, the method 200 comprises receiving information associated with the features by the mediation application.

At block 210, the method 200 comprises analyzing the information associated with the features by the mediation application based at least in part on invoking a ML model by the mediation application that executes on the computer system. At block 212, the method 200 comprises assembling a second message by the mediation application based on the first message.

At block 214, the method 200 comprises attaching metadata provided by analyzing the information associated with the features by the mediation application to the second message. At block 216, the method 200 comprises transmitting the second message. In an embodiment, the processing of method 200 further comprises receiving the first message in a first format and converting the first message to a second format. In this case, the mediation application parses the first message in the second format, and assembling the second message comprises building the second message in the first format. In an alternative case, for some messages, assembling the second message may comprise building the second message in a third format which is different from both the first format and the second format, for example a third format that is amenable for processing by a receiving application, service, or computer.

Figure 4:
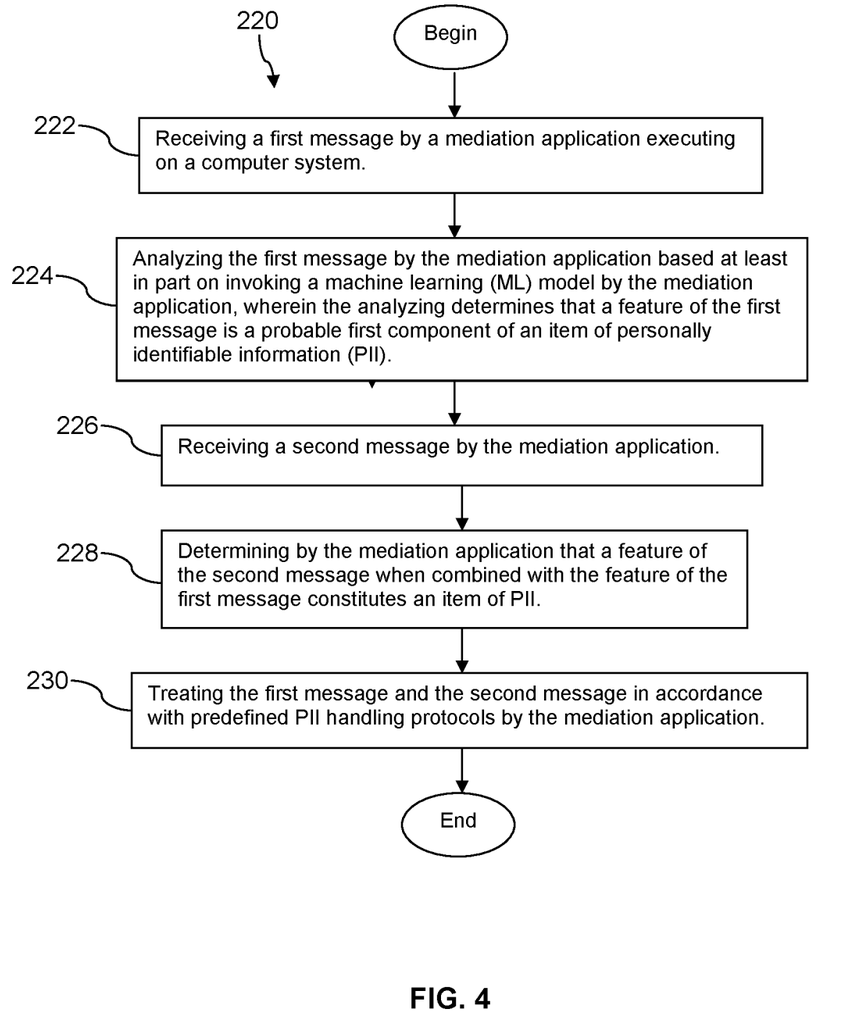
FIG. 4 is a flow chart of another method according to an embodiment of the disclosure.

Tuning now to FIG. 4, a method 220 is described. In an embodiment, the method 220 is a method of enhanced data orchestration (EDO). At block 222, the method 220 comprises receiving a first message by a mediation application executing on a computer system.

At block 224, the method 220 comprises analyzing the first message by the mediation application based at least in part on invoking a machine learning (ML) model by the mediation application, wherein the analyzing determines that a feature of the first message is a probable first component of an item of personally identifiable information (PII). At block 226, the method 220 comprises receiving a second message by the mediation application.

At block 228, the method 220 comprises determining by the mediation application that a feature of the second message when combined with the feature of the first message constitutes an item of PII. At block 230, the method 220 comprises treating the first message and the second message in accordance with predefined PII handling protocols by the mediation application.

In an embodiment, the mediation application attaches metadata to the first message, where the metadata is associated with results of the analysis associated with the one of the entity extraction ML model, the behavior anomaly ML model, the language translation ML model, or the sentiment analysis ML model. In an embodiment, treating the first message and the second message in accordance with predefined PII handling protocols comprises attaching a first tag to the first message identifying the probable first component of PII and identifying the second message and attaching a second tag to the second message identifying the feature of the second message and identifying the first message and transmitting the first message with the first tag attached and the second message with the second tag attached to a receiving application, whereby the receiving application is enabled to identify the item of PII constituted by a combination of the first message and the second message. In an embodiment, the first message is held in non-permanent memory storage during the processing of method 220. The first message may be held in non-permanent memory storage a predetermined period of time and then transmitted to a receiver, for example a receiving application, service, or computer. The predetermined period of time may allow for the second message comprising a feature that when combined with the feature of the first message constitutes PII. Storing the first message in non-permanent memory for the predetermined period of time may be referred to as caching the first message. The predetermined period of time may be about 15 seconds, about 30 seconds, about 1 minute, about 2 minutes, about 3 minutes, about 4 minutes, or about 5 minutes.

The present disclosure has also taught a system for building an enhanced data orchestration (EDO) enterprise service bus (see FIG. 2 and associated description above). The system comprises at least one processor, a non-transitory memory, a plurality of pre-trained machine learning (ML) models stored in the non-transitory memory, a base enterprise service bus application stored in the non-transitory memory, and an EDO builder application stored in the non-transitory memory. When executed by the at least one processor the EDO builder application presents a visual interface that responds to drag and drop command inputs that builds a sequence of data stream processes, presents a command input that when activated causes a properties dialog box to be presented that promotes a user defining data from the data stream to be passed in to the selected data stream process and defining data to be output by the selected data stream process, and builds a EDO enterprise service bus application based on the pre-trained ML models, based on the base enterprise service bus application, based on drag and drop command inputs, and based on user definitions of data provided through the properties dialog box.

Figure 5:
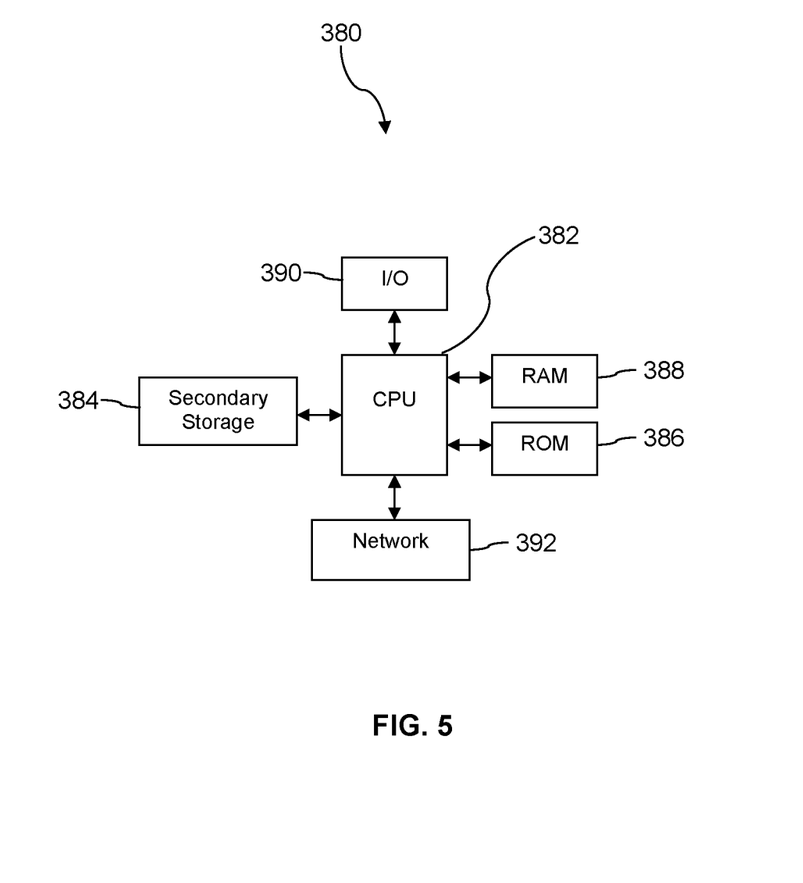
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), or radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage mediums having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for enhanced data orchestration (EDO) using pre-trained machine learning models, comprising:
    at least one processor;
    a non-transitory memory;
    a plurality of pre-trained machine learning (ML) models stored in the non-transitory memory;
    a data format conversion application stored in the non-transitory memory that, when executed by the at least one processor, receives a message in a first format and converts the content of the message to a second format, wherein the data format conversion application is configured to convert a plurality of different formats to the second format;
    a mediation application stored in the non-transitory memory that, when executed by the at least one processor, receives the message in the second format from the data format conversion application, processes the message using one or more of the pre-trained ML models to obtain metadata associated with the message, and attaches the metadata to the message in the second format, wherein the processing of the message to obtain metadata associated with the message using the one or more of the pre-trained ML models and attaching of the metadata obtained using the one or more of the pre-trained ML models to the message occurs in-flight without the mediation application storing the message in permanent storage; and
    a message reassembly application stored in the non-transitory memory that, when executed by the at least one processor, reassembles the message with the attached metadata and transmits the reassembled message and metadata.

2. The system of claim 1, wherein the pre-trained ML models comprise at least one entity extraction ML model.

3. The system of claim 2, wherein the one or more entity extraction ML model comprises a name entity extraction ML model, a date entity extraction ML model, a place entity extraction ML model, a currency entity extraction ML model, or a company entity extraction model.

4. The system of claim 1, wherein the pre-trained ML models comprise a sentiment analysis ML model.

5. The system of claim 1, wherein the pre-trained ML models comprise a behavioral anomaly ML model.

6. The system of claim 1, wherein the second format is an extensible markup language (XML) format or a JavaScript Object Notation (JSON) format.

7. A method of enhanced data orchestration (EDO), comprising:
    receiving a first message by a mediation application executing on a computer system;
    parsing the first message by the mediation application into features based at least in part on using a first machine learning (ML) model, wherein the parsing identifies an individual associated with the first message;
    based on the features and in response to the parsing, requesting information associated with the individual by the mediation application by accessing one or more of a social network web site, a demographic information application server, or a really simple syndication (RSS) feed to obtain information about the individual;
    receiving information associated with the individual by the mediation application;
    analyzing the information associated with the individual by the mediation application based at least in part on invoking a second ML model by the mediation application that executes on the computer system;
    assembling a second message by the mediation application based on the first message;
    attaching metadata obtained by analyzing the information associated with the individual and invoking the second ML model by the mediation application to the second message, wherein the assembling of the second message and attaching the metadata obtained by invoking the second ML model to the second message occurs in-flight without the mediation application storing the first or second messages in permanent storage; and
    transmitting the second message.

8. The method of claim 7, wherein the first message is received in a first format, further comprising converting the first message to a second format, wherein the mediation application parses the first message in the second format, and wherein assembling the second message comprises building the second message in the first format.

9. The method of claim 7, wherein the first message is not stored in permanent storage by the mediation application.

10. The method of claim 7, wherein the first ML model is an entity extraction ML model, a personally identifiable information (PII) ML model, a language translation ML model, a sentiment analysis ML model, or a behavior anomaly ML model.

11. The method of claim 7, wherein the second ML model is an entity extraction ML model, a personally identifiable information (PII) ML model, a language translation ML model, a sentiment analysis ML model, or a behavior anomaly ML model.

12. A method of enhanced data orchestration (EDO), comprising:
    receiving, by a data format conversion application stored in a non-transitory memory and executable by at least one processor, a message in a first format;
    converting, by the data format conversion application, the content of the message to a second format, wherein the data format conversion application is configured to convert a plurality of different formats to the second format;

receiving, by a mediation application stored in the non-transitory memory and executable by the at least one processor, the message in the second format from the data format conversion application;

processing, by the mediation application, the message using pre-trained ML models stored in the non-transitory memory to obtain metadata associated with the message;

attaching, by the mediation application, the metadata to the message in the second format, wherein the processing of the message to obtain metadata associated with the message using the pre-trained ML models and the attaching of the metadata obtained using the pre-trained ML models to the message occurs in-flight without the mediation application storing the message in permanent storage;

reassembling, by a message reassembly application stored in the non-transitory memory and executable by the at least one processor, the message with the attached metadata; and transmitting, by the message reassembly application, the reassembled message and metadata.

13. The method of claim 12, wherein the pre-trained ML models comprise at least one entity extraction ML model.

14. The method of claim 13, wherein the at least one entity extraction ML model comprises a name entity extraction ML model, a date entity extraction ML model, a place entity extraction ML model, a currency entity extraction ML model, or a company entity extraction model.

15. The method of claim 12, wherein the pre-trained ML models comprise a sentiment analysis ML model.

16. The method of claim 12, wherein the pre-trained ML models comprise a behavioral anomaly ML model.

17. The method of claim 12, wherein the second format is an extensible markup language (XML) format or a JavaScript Object Notation (JSON) format.

18. The method of claim 12, wherein processing the message comprises:

parsing, by the mediation application, the message into features based at least in part on using the pre-trained ML models, wherein the parsing identifies an individual associated with the message;

based on the features, requesting, by the mediation application, information associated with the individual by accessing one or more of a social network web site, a demographic information application server, or really simple syndication (RSS) feed to obtain information about the individual;

receiving, by the mediation application, information associated with the individual by the mediation application; and analyzing, by the mediation application, the information associated with the individual based at least in part on invoking one or more of the ML models to obtain metadata corresponding to the information associated with the individual.

19. The system of claim 1, wherein the processing of the message by the mediation application further comprises the mediation application being configured to:

parse the message into features based at least in part on using the pre-trained ML models, wherein the parsing identifies an individual associated with the message;

based on the features, request information associated with the individual by accessing one or more of a social network web site, a demographic information application server, or really simple syndication (RSS) feed to obtain information about the individual;

receive information associated with the individual by the mediation application; and analyze the information associated with the individual based at least in part on invoking one or more of the ML models to obtain metadata corresponding to the information associated with the individual.

\* \* \* \* \*